- - - - 1650°C, 30 MINUTES
——— 1850°C, 30 MINUTES
—·—·— 2050°C, 30 MINUTES

United States Patent Office 3,843,360
Patented Oct. 22, 1974

3,843,360
SINTERED TANTALUM FOR ELECTRODES OF CAPACITORS
Teruo Hanaoka, Tokyo, Hiro Naito, Yokohama, Akitoshi Komatsu, Shiojiri, Keizi Koyama, Aizuwakamatsu, Mitsuki Kobayashi, Nakano, and Naoaki Ohishi, Kawasaki, Japan, assignors to Showa Denko Kabushiki Kaisha, Tokyo, Japan
Filed May 20, 1971, Ser. No. 145,319
Int. Cl. B22f 1/00
U.S. Cl. 75—222                               1 Claim

ABSTRACT OF THE DISCLOSURE

A sintered tantalum anode for use in sintered electrolytic capacitors, the dissipation factor of which anode has been reduced, can be obtained by sintering a tantalum powder in which the relationship between the average particle diameter of the powder and its bulk density has been limited to a specified range.

---

This invention relates to improvements in sintered tantalum pellets for the formation of electrodes for use in sintered electrolytic capacitors.

The sintered tantalum electrolytic capacitor, as is well known, comprises an anode which is usually obtained by compression molding a tantalum powder of less than 35 Tyler mesh followed by sintering the so obtained molded product under vacuum to obtain a porous sintered mass, whose surface is then subjected to anodic oxidation to form a dielectric oxide film having a thickness of 400–4000 A., after which the pores on the cathodic side of the sintered mass are filled with, say, manganese dioxide. The dielectric oxide film of this anode contributes to the formation of capacitors of small size and high static capacitance.

One of the important properties that must be possessed by an electrolytic capacitor is that its dissipation factor is small. A primary object of the present invention is to provide sintered tantalum pellets which are suitable for use as the anode of capacitors wherein this dissipation factor is small and the static capacitance is maintained at a high level. It has now been found that the foregoing object can be attained by sintering a tantalum powder in which the relationship between the average particle diameter and bulk density is within a specified range.

For a better understanding of the invention we shall first describe the preliminary experimental research that we carried out.

The dissipation factor tan δ, of a sintered electrolytic capacitor is represented by the following equation:

$$\tan \delta = 2\pi f C R \quad (I)$$

where
$f$ is the alternating frequency, Hz. (cycle/sec.).
$C$ is the static capacitance ($\mu$F).
$R$ is the equivalent series resistance ($\Omega$).

The R in the foregoing equation (I) is represented by the following Equation II:

$$R = R_{ox} + R_e + R_i \quad (II)$$

where
$R_{ox}$ is the equivalent resistance by the dielectric loss of the oxide film.
$R_e$ is the resistance of the electrolyte at the cathodic side.
$R_i$ is the contact resistance of the oxide film-electrolyte-graphite layer-metallic layer-metallic case interfaces.

In the foregoing two equations, $f$ is defined by the alternating current used, while $R_{ox}$ and $R_i$ are inherent values based on the construction of the capacitor itself. On the other hand, in the case of C, a predetermined high value must be chosen depending upon the purpose for which the capacitor is to be used, i.e., the type of capacitor. Hence, the reduction of the dissipation factor of the sintered electrolytic capacitor depends on as to how the $R_e$ can be reduced while maintaining $C$ at the aforesaid high value.

Having observed that the dissipation factor was perhaps dependent on the structure of the pores of the sintered anode which is filled on its cathodic side with an electrolyte and that the porous structure of the anode was perhaps intimately related to the molded density of the starting tantalum powder, we investigated the relationship between these factors by means of experiments. The term "molded density," as here used, is meant to be the density of the green pellet obtained by the compression molding of the tantalum powder. As a result of the experiments, it became apparent that a reduction in the dissipation factor could be realized without lowering the capacitance by sintering a green pellet whose molded density of tantalum powder has been made as small as possible.

The symbols which are used in the description have the following meanings.

$D_g$. (g./cm.$^3$) is the density of the hereinbefore described pellet. In proportion as the molded density is reduced, the mechanical strength of the resulting molded product diminishes. In the case of a molded product whose molded density is excessively low, not only is trouble experienced in its handling before sintering, but also the product frequently disintegrates during the sintering step. Hence, there is imposed a limit as to the lowness of the molded density that can be employed. Thus, the lowest density of a molded product having enough mechanical strength for practical use may be referred to as the "minimum molded density." One standard measure to indicate the possession of this mechanical strength to a sufficient degree is to mix 2% by weight of camphor in a tantalum powder as binder, then compression mold this mixture into cylindrical pellets having a diameter of 5 millimeters and a weight of one gram, and thereafter drop the so obtained pellet onto a hard plastic plate from a height of 8 centimeters. If the pellet does not break by this test, it is considered to have enough mechanical strength for practical purposes.

$CR(\Omega \cdot \mu F)$ is, as shown in the aforesaid equation I, the product of the capacitance and equivalent series resistance per sintered anode and is equal to the quotient obtained by dividing the dissipation factor by $2\pi f$. This value is used in evaluating the dissipation factor.

$CV(\mu F \cdot V/g.)$ is the product of the static capacitance $C$ per unit weight of the tantalum and the forming voltage $V$ and is called the specific static capacitance. This is a value which is used for evaluating the static capacitance of a sintered anode.

EXPERIMENT 1

Usually used tantalum powder of six classes of varying average particle diameter was used, and cylindrical pellets each having a weight of 1.6 grams and a diameter of 5 mm. were molded. The molded densities of the several pellets are shown in Table 1.

TABLE 1

| Ta powder used | Molded density $D_g$. (g./cm.$^3$) | | | |
|---|---|---|---|---|
| (a) | 7.5 | 7.0 | | |
| (b) | 6.25 | 5.94 | | |
| (c) | 7.5 | 6.25 | 5.94 | |
| (d) | 8.0 | 7.5 | 6.25 | 5.79 |
| (e) | 7.5 | 6.5 | 6.25 | |
| (f) | 8.5 | 7.5 | 6.75 | 6.5 |

Figure 1:
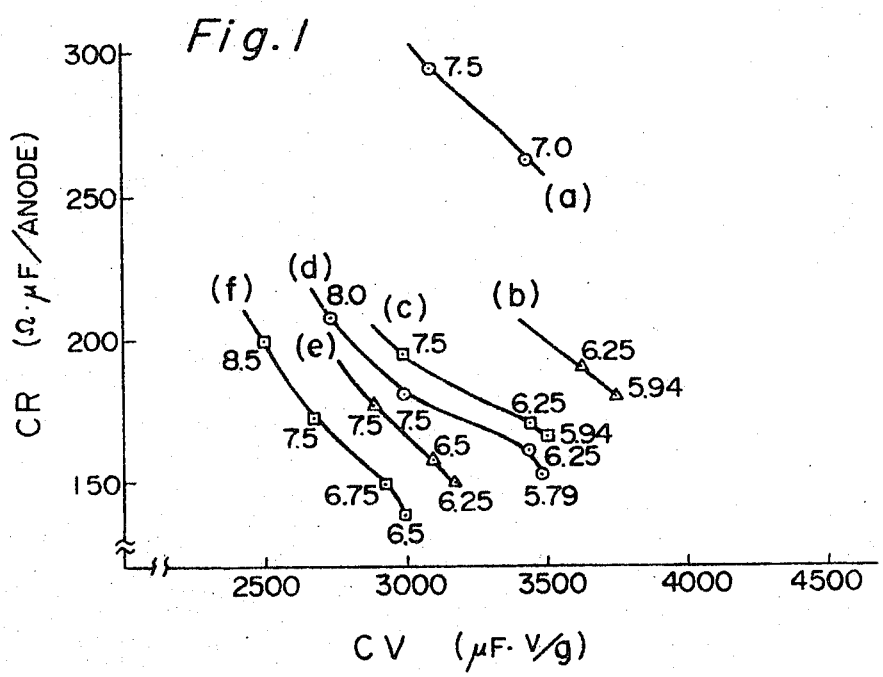
FIG. 1 shows the relationship between the molded density, CR, and CV.

After sintering the foregoing green pellets for 30 minutes at a temperature of 2050° C. under vacuum, they were formed up to 140 volts in 0.01 weight percent aqueous phosphoric acid solution at a temperature of 90° C. and an electric current density of 30 milliampere/gram. The CR($\Omega \cdot \mu$F) and CV($\mu$F·V/g.) of the so obtained tantalum anodes were measured in 10 weight percent aqueous phosphoric acid solution using as the cathode a tubular platinum black of 30 mm. diameter and 30 mm. length, at a temperature of 20° C., using an alternating current of a frequency of 120 Hz. The several measurement values were plotted with the results shown in FIG. 1. The alphabetic designations in the figure correspond to the tantalum powders used as shown in Table 1, and the numerals denote the molded densities Dg.

From this experiment it is apparent that a marked decrease takes place in the CR of any tantalum powder by reducing the molded density of the powder. On the other hand, a desirable tendency is demonstrated in the case of the CV in that there is rather a slight increase in this value as a result of a decrease in the molded density.

EXPERIMENT 2

Three classes of usually used tantalum powder of differing average particle diameter, as shown in Table 2, (i.e. of differing capacitance levels) were used, and cylindrical pellets of a weight of 1.6 grams and a diameter of 5 mm. were made in each case.

TABLE 2

| Ta powder used | Average particle diameter[1] ($\mu$) | Molded density Dg. (g./cm.$^3$) | | |
|---|---|---|---|---|
| (g) | 7.88 | 8.0 | | 7.0 |
| (h) | 7.96 | 8.0 | | 7.0 |
| (i) | 9.49 | 8.5 | | 7.5 |

[1] Average particle diameter by air permeability method. This average particle diameter F was obtained in the following manner. A specific surface area measuring apparatus manufactured by Shimadzu Seisakusho, Japan, was used, and the specific surface area Sw was measured. The average particle diameter F was then calculated as follows:

$$F = \frac{6}{16.6\, Sw}$$

Figure 2:
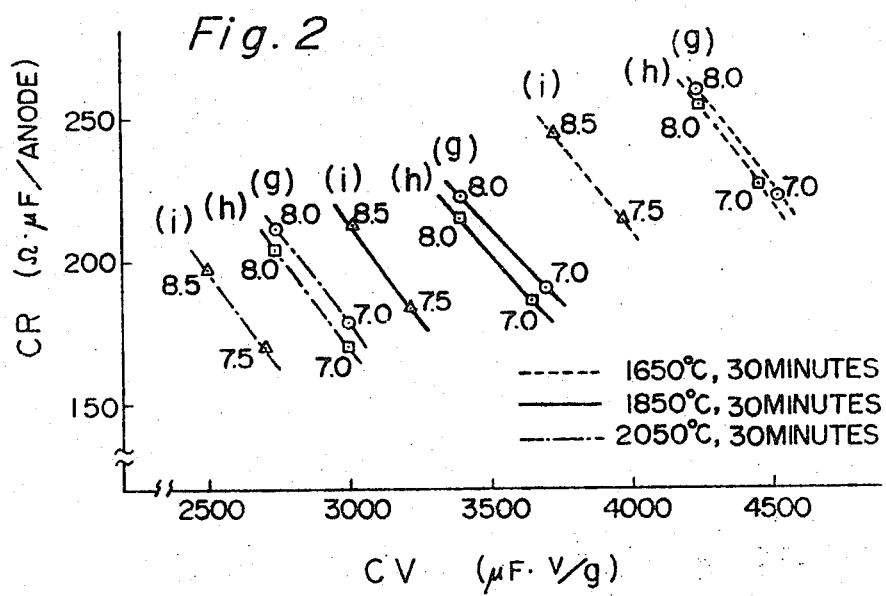
FIG. 2 shows the relationship between the powder density, molded density, sintering temperature, CR, and CV.

The several pellets were sintered in vacuo under the three conditions of 1650° C., 30 minutes; 1850° C., 30 minutes; and 2050° C., 30 minutes. The so obtained sintered pellets were measured for their CR and DV values as in Experiment 1. The several measurement values were plotted with the results shown in FIG. 2. The alphabetic designations in FIG. 2 correspond to the tantalum powder used shown in Table 2, and the numerals denote the molded density Dg. The curve · · · · · is that sintered for 30 minutes at 1650° C., the curve ——— is that sintered for 30 minutes at 1850° C., and the curve — · — · is that sintered for 30 minutes at 2050° C.

From Experiment 2 it can be seen that the same conclusion as in the case of Experiment 1 applies irregardless of the sintering temperature.

Thus it was found from the foregoing experiments that for obtaining a lower dissipation factor without reducing the CV it is important to decrease the molded density as much as possible. However, the objects of the invention cannot be completely achieved by such a finding alone, because there still remains the problem of how to obtain a molded product having not only a molded density of such a smallness as to be satisfactory but also a mechanical strength such as to be serviceable, i.e. the problem of how to reduce the minimum molded density. The present invention provides a solution to such a technical problem. A detailed description of this will be given hereinafter.

As a result of having observed that the bulk density of the tantalum powder used was perhaps an important factor bearing on the molded density, we fully examined the relationship between the three factors of the average particle diameter of the powder, its bulk density and the minimum molded density.

As a consequence it was confirmed that the minimum molded density of tantalum powder decreases in proportion as the average diameter becomes smaller and at the same time the bulk density decreases. Hence, the average particle diameter reflects the capacitance level of the tantalum powder, and the average particle diameter of the tantalum powder to be used for the capacitor, which is specified by the difference in CV, is determined by the grades of the tantalum powder used. In consequence, for obtaining a given CV the range of the average particle diameter is automatically restricted. Therefore, for obtaining pellets of the same CV and moreover of a lower CR, it is necessary to use a powder whose bulk density is a minimum within the restricted range of average particle diameter and to mold the pellets with the lowest possible molded density.

The reason why a molded product having a sufficient mechanical strength is obtained even though the molded density is lower when the bulk density is lowered within a given range of average particle diameter is believed to be based on the fact that the compressive ratio becomes higher in molding a powder to a given density in the case where the powder is of a smaller bulk density, with the consequence that the intertwinement of the powder particles becomes more intensive.

The relationship between the average particle diameter F (measured by air permeability method) and the bulk density $d$ in the case of the tantalum powders which have been usually used in preparing the sintered tantalum anode in the past is as shown in Table 3. In the method of making tantalum powders disclosed in U.S. Pats. 3,418,106 and 3,473,915, the average particle diameter and bulk density of the powders obtained are both within these ranges. The bulk density is obtained by means of the Scott number measuring apparatus of Fisher Scientific Company, U.S.A.

TABLE 3

| Average particle diameter (micron) | Bulk density $d$ (g./cm.$^3$) |
|---|---|
| 12–8.4 | 5.0 > $d$ > 3.8 |
| 8.4–7.8 | 4.5 > $d$ > 3.4 |
| 7.8–7.2 | 4.0 > $d$ > 3.2 |
| 7.2–2 | 3.8 > $d$ > 3.0 |

In consequence of having carried out numerous experiments, we now found that the tantalum powders having the relationships between average particle diameter and bulk density such as indicated in Table 4, below, could provide molded products having a smaller molded density at the same average particle diameter than that provided by the usually used tantalum powders shown in Table 3, above, and thus could provide sintered anodes of a small dissipation factor and of a sufficiently great mechanical strength.

TABLE 4

| Average particle diameter (micron) | Bulk density $d$ (g./cm.$^3$) |
|---|---|
| 12–8.4 | 3.6 ≧ $d$ ≧ 2.8 |
| 8.4–7.8 | 3.4 ≧ $d$ ≧ 2.3 |
| 7.8–7.2 | 3.2 ≧ $d$ ≧ 1.8 |
| 7.2–2 | 2.8 ≧ $d$ ≧ 1.5 |

It is apparent that the relationship between the average particle diameter and the bulk density of the tantalum powders shown in Table 4 belong to a different area than that of the usually used tantalum powders shown in Table 3.

When the upper limit of the bulk density given in Table 4 is exceeded, attempts to reduce the CR by lowering the molded density brings about a disintegration of the pellets. On the other hand, in the case of powders below the lower limit, not only is it difficult to carry out the manufacturing operation as a practical matter but supposing such a powder were used, troubles would arise in connection with its handling, such as the difficulty of feeding the powder in constant quantities to the molding die. Hence, difficulty is involved in using such a powder.

Therefore, the present invention is directed to an improved process for making a sintered tantalum anode for use in sintered electrolytic capacitors by sintering a tantalum powder, the improvement comprising the use as the tantalum powder one whose relationship between the average particle diameter F ($\mu$) as obtained by the air permeability method and the bulk density $d$ (g./cm.$^3$) satisfies the following conditions:

| | |
|---|---|
| when $12 \geq F > 8.4$, | $3.6 \geq d \geq 2.8$; |
| when $8.4 \geq F > 7.8$, | $3.4 \geq d \geq 2.3$; |
| when $7.8 \geq F > 7.2$, | $3.2 \geq d \geq 1.8$; or |
| when $7.2 \geq F > 2$, | $2.8 \geq d \geq 1.5$. |

A tantalum powder which satisfies these conditions yields a desirable product at all times. And it is most preferred that such a powder be compression molded so as to have a minimum molded density. However, it is not necessarily required that the minimum molded density be achieved, because there is the advantage that the mechanical strength becomes for greater than that of the usually used powders outside the scope of the present invention even when the product is used at a point somewhat above the minimum molded density.

The use, such as hereinbefore described, of a tantalum powder having a bulk density of a range that has been specified in accordance with the average particle size of the powder as in this invention has not been made heretofore nor has such a proposal been made. The reason is because no studies at all have been made to date concerning the relationship of the three factors of particle size, bulk density and minimum molded density, and the obtainment thereby of a sintered anode having a small dissipation factor, though the particle size and the relationship between the particle size and bulk density have been the subject of discussion.

A tantalum powder of small bulk density, such as hereinbefore described, can be prepared under specially controlled conditions. One method, for example, is carried out in the following manner. The usually used tantalum powder is spread in a thin layer of less than about one centimeter in thickness and lightly sintered under either vacuum or an atmosphere of an inert gas to form aggregates having a high rate of voids. These aggregates are then comminuted with a controlled force.

EXAMPLE

Four classes of usually used tantalum powders $A_1$, $B_1$, $C_1$ and $D_1$ of differing average particle diameter were used as the control samples.

The foregoing control samples were each spread lightly as a layer of about 3-mm. thickness and lightly sintered by heat treating in vacuo for 15 minutes at 1570° C. The so obtained sintered products were crushed lightly by means of a stamp mill, and powders of less than 35 Tyler mesh were obtained. These are designated Samples $A_2$, $B_2$, $C_2$ and $D_2$.

Sintered products obtained by the same procedure as hereinbefore described were crushed extremely lightly by means of a stamp mill, and powders of less than 35 Tyler were obtained. These are designated Samples $A_3$, $B_3$, $C_3$ and $D_3$.

The results obtained on measuring these 12 classes of tantalum powders for their average particle diameter, bulk density, minimum molded density, as well as the CR and CV values, and, in addition, the R value in Equation I are shown in Table 5.

The average particle diameter is obtained by the air permeability method.

The minimum molded density was determined in the following manner. The tantalum powder sample was mixed with 2% of camphor as the binder and molded into cylindrical pellets of a diameter of 5 mm. and a weight of one gram. The so obtained pellet was dropped onto a polyethylene plate from a height of 8 centimeters and the minimum density at which the pellet did not break was obtained, this value being designated the minimum molded density.

The several powders were molded into pellets having the minimum molded density by the same procedure described in the foregoing Experiment 1, after which the resulting green pellets were each sintered for 30 minutes at 1950° C.

The CV and CR values of the sintered pellets were measured as in Experiment 1.

The tan $\delta$ (dissipation factor) and R were obtained by calculation using Equation I.

TABLE 5

| Ta powder sample | Average particle diameter ($\mu$) | Bulk density (g./cm.$^3$) | Minimum molded density (g./cm.$^3$) | CV ($\mu$F·V/g.) | CR ($\Omega$·$\mu$F) | Tan $d$ (percent) | R ($\Omega$) |
|---|---|---|---|---|---|---|---|
| Control: | | | | | | | |
| A1 | 11.0 | 4.5 | 7.5 | 2,400 | 115 | 8.66 | 4.19 |
| B1 | 7.9 | 3.7 | 6.8 | 3,100 | 145 | 10.9 | 4.09 |
| C1 | 7.3 | 3.5 | 6.5 | 3,300 | 152 | 11.5 | 4.03 |
| D1 | 6.5 | 3.2 | 6.0 | 3,650 | 165 | 12.4 | 3.96 |
| Invention: | | | | | | | |
| A2 | 11.3 | 3.6 | 6.5 | 2,470 | 100 | 7.54 | 3.54 |
| B2 | 8.1 | 3.4 | 6.5 | 3,170 | 125 | 9.42 | 3.45 |
| C2 | 7.6 | 3.2 | 6.0 | 3,380 | 130 | 9.80 | 3.36 |
| D2 | 7.0 | 2.8 | 5.5 | 3,720 | 140 | 10.5 | 3.29 |
| A3 | 11.5 | 3.4 | 6.4 | 2,490 | 98 | 7.39 | 3.44 |
| B3 | 8.2 | 3.2 | 6.2 | 3,170 | 123 | 9.26 | 3.39 |
| C3 | 7.7 | 3.0 | 5.8 | 3,420 | 125 | 9.42 | 3.20 |
| D3 | 7.1 | 2.5 | 5.3 | 3,750 | 135 | 10.2 | 3.15 |

As can be appreciated from Table 5, when use is made of a tantalum powder coming within the scope of the present invention, the minimum molded density becomes exceedingly small for all the several average particle sizes. In consequence, the CR values, tan $\delta$ and R values obtained by employment of these molded densities are exceedingly small as compared with the cases where powders coming within the same average particle size range but without the scope of the present invention are used. And in this case the CV value does not decrease but rather shows a slight increase.

We claim:

1. In a method of making a tantalum anode comprising (a) compression molding a tantalum power, (b) sintering the resulting molded product under vacuum to form a porous sintered mass, (c) subjecting said porous sintered mass to anodic oxidation to form a dielectric oxide film having a thickness of 400–4,000 A., and (d) filling the pores of the cathode side of said sintered mass with magnesium dioxide, the improvement wherein said tantalum powder has an average particle diameter by the air permeability method F ($\mu$) and a bulk density $d$ (g./cm.$^3$) relationship such that when $12 \geq F > 8.4$, $\quad 3.6 \geq d \geq 2.8$;
when $8.4 \geq F > 7.8$, $\quad 3.4 \geq d \geq 2.3$;
when $7.8 \geq F > 7.2$, $\quad 3.2 \geq d \geq 1.8$; or
when $7.2 \geq F > 2$, $\quad 2.8 \geq d \geq 1.5$.

References Cited
UNITED STATES PATENTS

| | | | |
|---|---|---|---|
| 3,473,915 | 10/1969 | Pierret | 75—84 |
| 3,476,557 | 11/1969 | Fincham | 75—222 |
| 3,418,106 | 12/1968 | Pierret | 75—84 |
| 3,422,515 | 1/1969 | Klein | 75—222 |

CARL D. QUARFORTH, Primary Examiner

B. HUNT, Assistant Examiner

U.S. Cl. X.R.

75—200, 213

UNITED STATES PATENT OFFICE
CERTIFICATE OF CORRECTION

Patent No. 3,843,360      Dated October 22, 1974

Inventor(s) Teruo HANAOKA ET AL

It is certified that error appears in the above-identified patent and that said Letters Patent are hereby corrected as shown below:

In the Heading, insert patentees' Claim for Priority as follows:--Claims priority, application Japan, May 28, 1970, No. 45146/70.--

Column 7, lines 1-2: cancel "magnesium" and substitute -- manganese --

Column 6, line 71, "power" should read -- powder --.

Signed and sealed this 11th day of March 1975.

(SEAL)
Attest:

RUTH C. MASON
Attesting Officer

C. MARSHALL DANN
Commissioner of Patents
and Trademarks